United States Patent [19]
Chen

[11] Patent Number: 5,712,728
[45] Date of Patent: Jan. 27, 1998

[54] METHODS AND DEVICES INCORPORATING WIDEBAND FARADAY ROTATION

[76] Inventor: Peter Chen, 2250 Harborview Dr., San Leandro, Calif. 94577

[21] Appl. No.: 554,034

[22] Filed: Nov. 6, 1995

Related U.S. Application Data

[63] Continuation of Ser. No. 319,436, Oct. 6, 1994.

[51] Int. Cl.⁶ .................................................. G02B 5/30
[52] U.S. Cl. ........................... 359/484; 359/495; 359/496; 359/500; 372/703
[58] Field of Search ........................... 359/281, 282, 359/283, 484, 494, 495, 496, 284, 309, 483, 500, 615, 501; 372/703

[56] References Cited

U.S. PATENT DOCUMENTS

| | | | |
|---|---|---|---|
| 5,052,786 | 10/1991 | Schultz | 359/500 |
| 5,341,235 | 8/1994 | Watanabe et al. | 359/484 |
| 5,402,260 | 3/1995 | Tsuneda et al. | 359/484 |

FOREIGN PATENT DOCUMENTS

| | | | |
|---|---|---|---|
| 55-89815 | 7/1980 | Japan | 359/484 |
| 59-22026 | 2/1984 | Japan | 359/484 |
| 62-242915 | 10/1987 | Japan | 359/484 |
| 1-188834 | 7/1989 | Japan | 359/484 |
| 2-160213 | 6/1990 | Japan | 359/483 |
| 5-134275 | 5/1993 | Japan | 359/484 |
| 6-18827 | 1/1994 | Japan | 359/484 |

*Primary Examiner*—Paul M. Dzierzynski
*Assistant Examiner*—John Juba, Jr.
*Attorney, Agent, or Firm*—William Squire

[57] ABSTRACT

Methods and devices incorporating wideband Faraday Rotation in which light having mixed wavelengths is dispensed according to wavelength and passed through a magnetic optical rotator along pathways of different lengths progressively and inversely with respect to wavelength so that shorter wavelengths travel proportionally longer pathways than longer wavelengths sufficiently that the angle of rotation is substantially equal for all wavelengths within the waveband.

24 Claims, 4 Drawing Sheets

F I G. 1
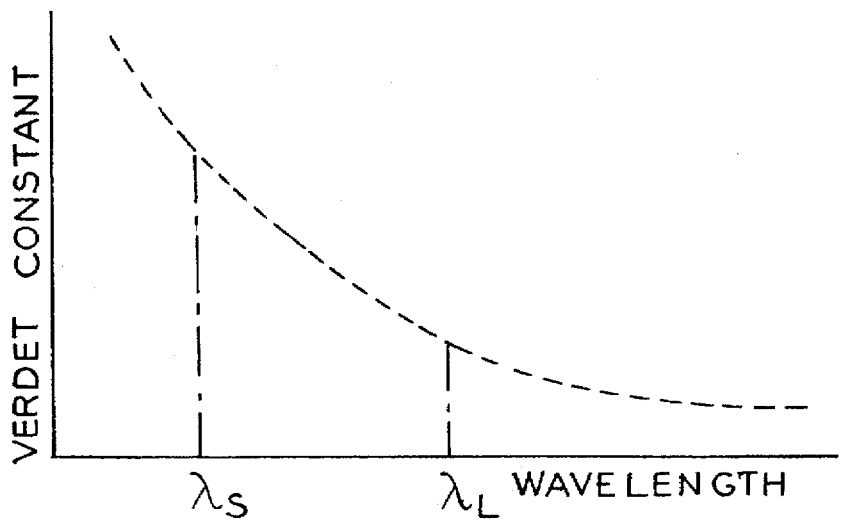
F I G. 2
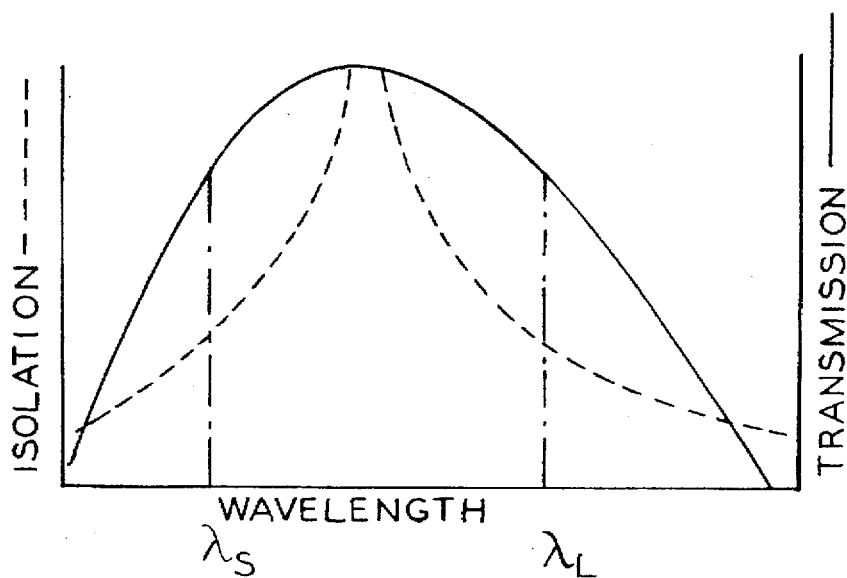

METHODS AND DEVICES INCORPORATING WIDEBAND FARADAY ROTATION

This application is a continuation of co-pending application Ser. No. 08/319,436 filed Oct. 6, 1994.

This invention relates to Faraday Rotators generally and specifically to methods and devices incorporating wideband Faraday Rotation such as optical isolators.

Rotation of the vector or plane of polarization of light by a Faraday rotator is well-known in the art as is its use in devices such as optical isolators.

Faraday rotation of polarized light is non-reciprocal. Thus the direction of rotation of the vector or plane of polarization is independent of the direction the light propagates through the rotator. In an optical isolator, Faraday rotation is employed to minimize the amount of light propagated in a direction opposite the intended direction of light transmission. Optical isolators typically include a Faraday rotator in the form of a magneto-optical wafer (MO wafer) within a magnetic field which rotates the vector or plane of polarization of light transmitted therethrough in an amount determined by the Verdet constant of the MO wafer, the length of the light path through the MO wafer in the direction of light propagation and the strength of the magnetic field by the equations:

$$\Theta = \Theta_f + \Theta_b$$

$$\Theta_f = HLV$$

Where: $\Theta_f$ is the angle of Faraday rotation;

$\Theta_b$ is the residual angle of rotation induced by the Bi-refringent effect;

H is the strength of the applied magnetic field along the direction of light propagation;

L is the length of the light path through the MO wafer in the direction of light propagation;

V is the Verdet constant along the direction of light propagation.

Usually $\Theta_b << \Theta_f$ in an optical isolator application.

In an optical isolator, the Faraday rotator is placed between a pair of light polarizers which are aligned so that the vector or plane of polarization of the output polarizer is rotationally displaced 45 degrees relative to the vector or plane of polarization of the input polarizer at a predetermined wavelength $\lambda$. Where $\Theta_b$ is very large and cannot be eliminated otherwise, the planes of polarization of the input and output polarizers are displaced 45 degrees plus $\Theta_b$ the predetermined wavelength $\lambda$.

With respect to light passing in the forward direction, the light from the input polarizer passes through the output polarizer with no insertion loss. Because $\Theta_b$ is reciprocal, reflected light rotation is $2 \times \Theta_f$ or 90 degrees. Thus, no reflected light can pass rearwardly through the input polarizer.

Nevertheless, problems can arise due to variations in wavelength of the transmitted light. The Verdet constant of an MO wafer varies generally inversely and non-linearly with increasing wavelength as is shown in FIG. 1. Thus, both the forward transmission and rearward reflection of light passing through a Faraday rotator is wavelength dependent. In an optical isolator employing a Faraday rotator, both forward transmission and reflection isolation will degrade as the wavelength of the light varies as is illustrated in FIG. 2.

An aspect of the present invention is to provide methods for wideband, substantially wavelength independent Faraday rotation of polarized light by means of passing light dispersed according to wavelength through pathways of different lengths in a Faraday rotator preferably by disposing the magnetic axis of the Faraday rotator at an angle to the path of transmission of each different wavelength of light transmitted therethrough.

Another aspect of the invention is to provide methods for wideband, substantially wavelength independent Faraday rotation of polarized light including dispersing a light source of mixed wavelength as a function of wavelength, passing the dispersed light through magneto-optical means so that the shorter wavelengths travel sufficiently shorter distances through the magneto-optical means than longer wavelengths so that the angle of rotation of the vector or plane of polarization for each wavelength is substantially the same, and passing the light emitting from the magneto-optical means through means for converging the dispersed light into parallel paths.

Yet another aspect of the invention is to provide devices for practicing the above methods which include light dispersing means, magneto-electric means in light intercepting relationship to dispersed light transmitted through the light dispersing means at different angles to each different wavelength of dispersed light path so that shorter wave lengths of dispersed light travel sufficiently shorter distances through the magneto-electric means than longer wavelengths sufficiently that the angle of rotation of the vector or plane of polarization of each different wavelength is substantially the same, and dispersed light converging means in light intercepting relationship to light emitting from the magneto-optical means to converge the dispersed light into parallel paths.

Still another aspect of the invention is to provide an optical isolator employing the above method and devices which isolator includes first light polarizing means, light dispersing means as a function of wavelength in light intercepting relationship to the first light polarizing means, a Faraday rotator in light intercepting relationship to the light emitting from the first light polarizing means disposed at an angle to the direction of light passing therethrough such that shorter wavelengths travel sufficiently shorter distances through the Faraday rotator than longer wavelengths so that the angle of rotation of the vector or plane of polarization of each different wavelength is substantially the same, dispersed light converging means in light intercepting relationship to light emitting from the Faraday rotator sufficient to converge the dispersed light of different wavelengths into parallel paths, and second polarizing means in light intercepting relationship to light emitting from the converging means, the vector or plane of polarization of the second polarizing means being displaced 90 degrees from the vector or plane of polarization of the first polarizing means.

Yet still another aspect of the invention is to provide devices employing the above methods in which the Faraday rotator is angularly adjustable with respect to the path of transmission of light so as to be tunable to light having a wide range of wavelengths to achieve substantially wavelength independent Faraday rotation.

The various aspects of invention may be understood by reference to the drawings and specification set forth below in which:

FIG. 1 is a graph of the dependence of the Verdet constant on wavelength for a typical MO wafer;

FIG. 2 is a graph of the dependence of both optical isolation and transmission on wavelength in a typical optical isolator;

Figure 3:
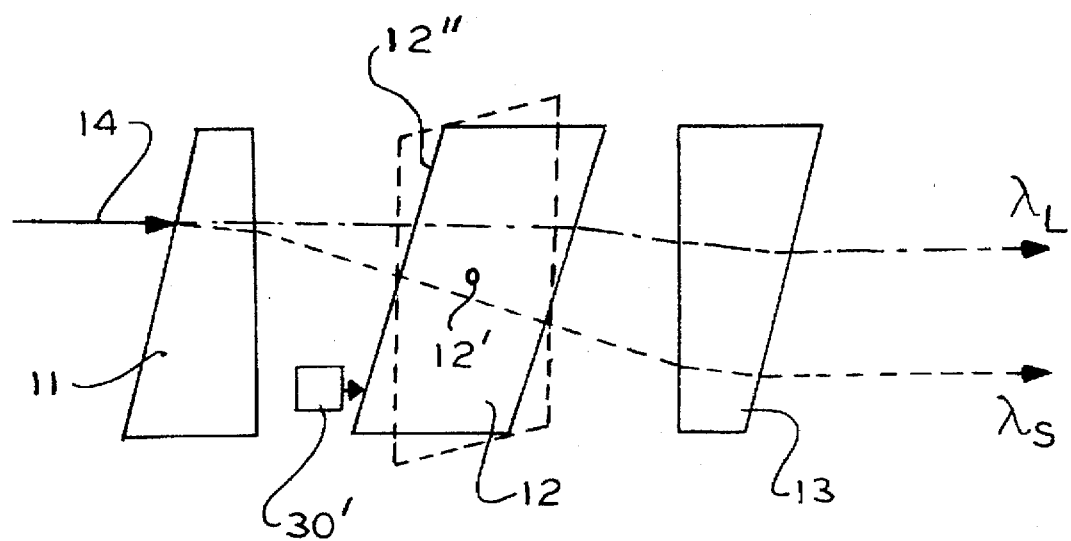
FIG. 3 is a schematic, side elevational cross-sectional view of a wideband Faraday rotator in accordance with the present invention.
Figure 4:
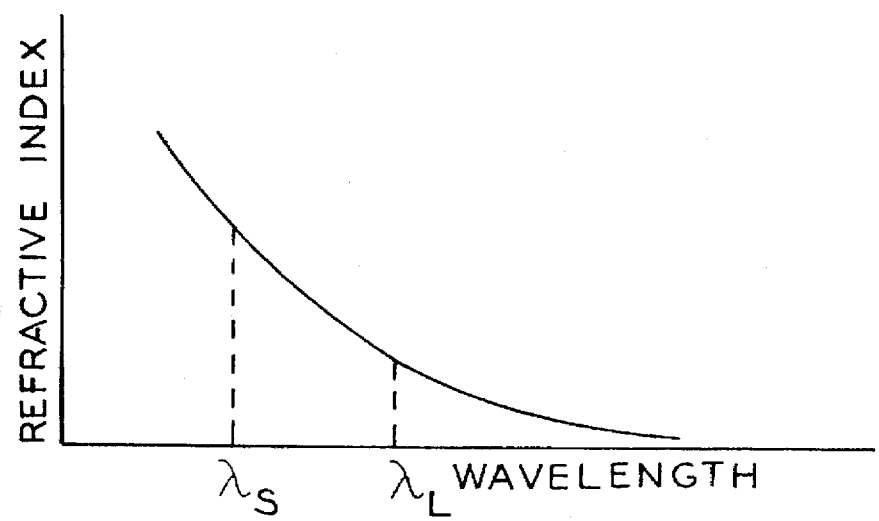
FIG. 4 is a graph of the dependence of refractive index on wavelength of a typical dispersion crystal useful in the present invention.

Referring now to the drawings in detail, FIG. 3 shows a wideband, substantially wavelength independent Faraday rotator comprising a first light dispersion prism, 11, a Faraday rotator, 12, and a second light dispersion prism, 13. The prisms, 11 and 13, each preferably have a refractive index strongly dependent on wavelength. A beam of light, 14, having a range of wavelengths from $\lambda_S$ (shorter) to $\lambda_L$ (longer) is shown passing through prism, 11. The deviation angle of the shorter wavelength is greater than the deviation of the longer wavelength with proportional deviation angles for wavelengths in between.

The Faraday rotator, 12, is in light intercepting relationship to the dispersed light transmitted through the first prism, 11, and disposed at an angle to the path of transmission of the dispersed light in such a manner that the shorter wavelengths travel a shorter pathway distance through the Faraday rotator than do the longer wavelengths. Because the Verdet constant for a given magneto-optical wafer is greater for shorter wavelengths than longer wavelengths, and because the degree of rotation is a function of both the Verdet constant and the distance of light travel through the rotator in accordance with the equation $\Theta_f = HLV$, the degree of rotation of shorter wavelengths will generally be greater than longer wavelengths when employing a Faraday rotator in which the path of light transmission or propagation is parallel to the optical axis of the rotator. Thus, if all wavelengths pass an equal distance through the rotator, the shorter wavelengths will be rotated a greater angle than the longer wavelengths. To overcome this, the optical axis of the Faraday rotator, 12, of the present invention is disposed at an angle to the direction of propagation of the dispersed light in such a manner that the pathways of the shorter wavelengths are shorter than the pathway of the longer wavelengths. Thus, the greater distance of travel of the longer wavelength will offset the decreased Verdet constant for the longer wavelength as compared to that of the shorter wavelength. If the angle between the magnetic axis of the Faraday rotator, 12, and the path of propagation of light passing therethrough is properly chosen with regard to the range of light wavelengths, the angle of Faraday rotation for all wavelengths within the range can be made substantially the same or at least the difference or range of differences in the angles of rotation minimized.

The Faraday rotator 12, FIG. 3, is commercially available and is constructed to cause the angle of the Faraday rotation by the rotator for different dispersed light wavelength ranges from corresponding different light beams to be made substantially the same or at least the difference in the angles of rotation minimized. This Faraday rotation action is in accordance with the angle of incidence of light on a rotator 12 surface, e.g., surface 12", FIG. 3, and the parameters of the rotator 12.

In one aspect of the present invention, the rotator 12 relative angular position about axis 12' corresponding to a given wavelength range of incident light determines the angle of incidence of that range thereon. Thus to provide desired angle of incidence on the rotator 12 surface 12" to thereby provide the desired substantially same rotation of the wavelengths passed through the rotator, the rotator 12 is rotated about axis 12' by a rotation device 30, FIG. 3. The rotator 12 is angularly positioned to a location corresponding to a given wavelength band of incident light from beam 14.

For example, a blue light spectrum will have a different set of wavelengths as compared to a red light spectrum. The angle of incidence of the blue light is required to be different than that of the red light in order for the rotator 12 to rotate the dispersed spectral components thereof in the desired manner described.

The required angle of incidence of light will change as the wavelengths change die to action of the prism 11 in a known way. This change in angle of incidence, in accordance with an embodiment of the present invention, requires the rotator to be rotated to obtain the desired action.

What is important is that the rotator 12 is constructed such that when the dispersed wavelengths of light from beam 14 incident on surface 12" are relatively angularly displaced to shift their angle of incidence on surface 12", the angular Faraday rotation function of the rotator 12 described above with respect to those incident wavelengths is maintained for a plurality of beams 14 of different wavelengths.

In the preferred embodiment, as a beam 14 wavelength spectral band changes to include different wavelength components, the rotator 12 is rotated about axis 12' to be responsive, i.e., tuned, to the wavelengths of the dispersed light of that corresponding beam 14.

The rotator 12 is merely angularly positioned, i.e., tuned, about axis 12' to correspond to and be responsive to the range of incident wavelengths of a particular beam 14.

Since light transmitted through the Faraday rotator, 12, is still dispersed, a second prism, 13, is placed in light intercepting relationship to the dispersed light emitted from the Faraday rotator 12 but with its dispersion set in the opposite direction than the first prism, 11. The second prism, 13, will cause a convergence of the dispersed light preferably to parallel paths.

Figure 5:
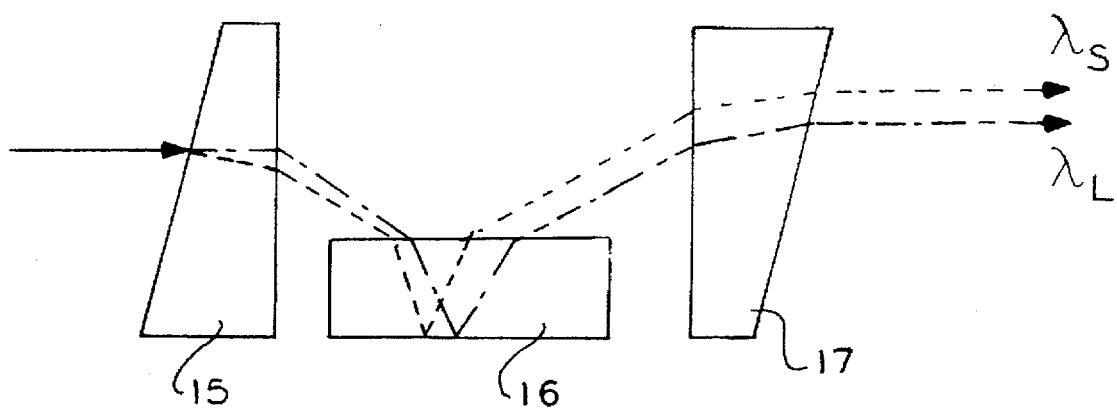
FIG. 5 is a schematic, side elevational cross-sectional view of an alternative wideband Faraday rotator in accordance with the present invention.

FIG. 5 shows an alternative form of wideband, substantially wavelength independent Faraday rotator in accordance with the present invention in which the Faraday rotator is employed in a reflection mode. FIG. 5 shows a first light dispersing prism, 15, a Faraday rotator, 16, and a second light dispersing prism, 17. The sensitivity of the Faraday rotator, 16, to light pathway difference is much greater in the reflection mode than in the transmission mode because in reflection, the angle of incidence is equal to the angle of reflection. Thus, as shown in FIG. 5, the dispersed shorter wavelength $\lambda_S$ travels a shorter distance through the rotator, 16, than the longer wavelength $\lambda_L$.

Figure 6:
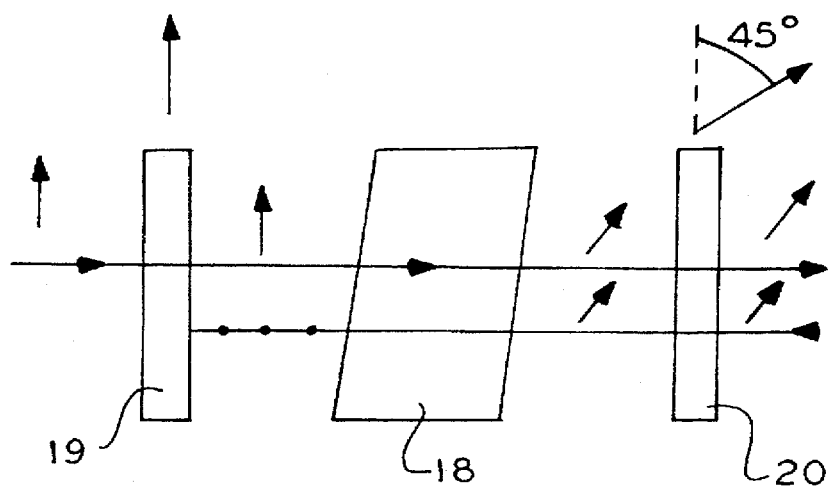
FIG. 6 is a schematic, side elevational cross-sectional view of a wideband optical isolator in accordance with the present invention.

FIG. 6 shows schematically a typical configuration for an optical isolator employing the wideband, substantially wavelength independent Faraday rotator of the present invention. In FIG. 6, the combination of the Faraday rotator and first and second dispersion prisms of FIG. 3, is depicted schematically as element 18. A first or input light polarizer, 19, and a second or output light polarizer, 20, are positioned for mutual light interception with the combination dispersion elements and Faraday rotator, 18. The vector or plane of polarization of the output polarizer, 20, is displaced 45 degrees from that of the input polarizer, 18. The wavelength independent Faraday rotator-dispersion elements combination, 18, rotates the vector of input polarization of all wavelengths 45 degrees. The input light, 21, passes through each of the elements and is rotated 90 degrees. Reflected light, 22, incident on the output side of the output polarizer, 20, is rotated 90 degrees relative to the input polarizer, 19, when it passes rearwardly. Accordingly, there is no reverse transmission through the input polarizer, 19.

Figure 7:
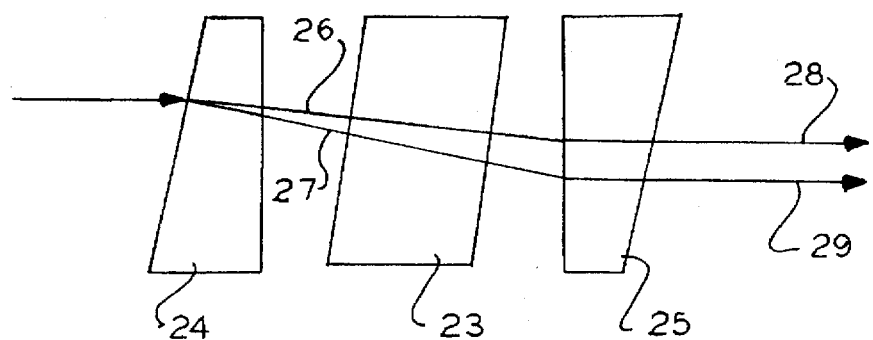
FIG. 7 is a schematic, side elevational cross-sectional view of an alternative wideband optical isolator in accordance with the present invention employing bi-refringent means showing the forward path of transmission of a range of different wavelengths of light.

FIG. 7 shows schematically a typical configuration for an optical isolator employing the wideband, substantially wavelength independent Faraday rotator of the present invention in combination with two bi-refringent elements. In FIG. 7, element, 23, is the combination Faraday rotator and dispersion elements shown in FIG. 3. A first or input bi-refringent element, 24, and a second or output bi-refringent element, 25, are placed in mutual light intercepting relationship to the Faraday rotator combination element, 23. The optical axis of the output bi-refringent element, 25, is rotated 45 degrees with respect to the input element, 24. The input bi-refringent element, 24, divides the input, non-polarized light into an ordinary wave, 26 and an extraordinary wave, 27. Each of waves, 26 and 27 are independently rotated 45 degrees when passing through element, 23 and bi-refringent element, 25.

Figure 7A:
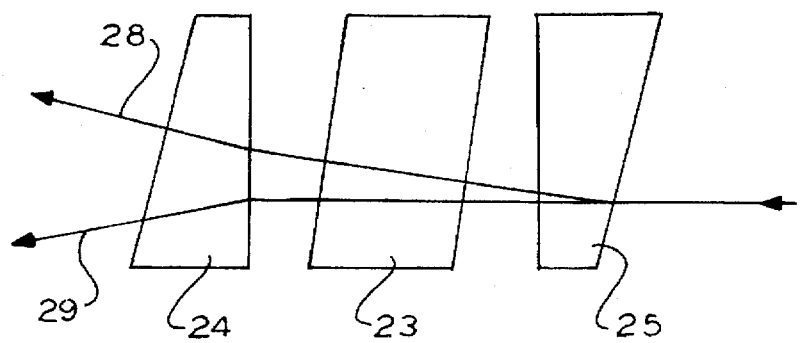
FIG. 7(a) is a schematic, side elevational cross-sectional view of the alternative optical isolator shown in FIG. 7 showing the rearward path of transmission of reflected light of different wavelengths.

Light incident on the output side of bi-refringent element, 25, will generate ordinary and extraordinary waves, 28 and 29, as shown in FIG. 7(a) which lack the proper phase relationship to recombine after passing through input bi-refringent element, 24. Recombination is impossible because when the angle between the two optic axis of the input and output bi-refringent elements, 24 and 25, is 45 degrees, ordinary light and extraordinary light paths will be 90 degrees out of phase. Accordingly, reflected light passing rearwardly is minimized. The use of the substantially wavelength independent Faraday rotator of the present invention makes the use of a bi-refringent type of optical isolator substantially wavelength independent.

Figure 8:
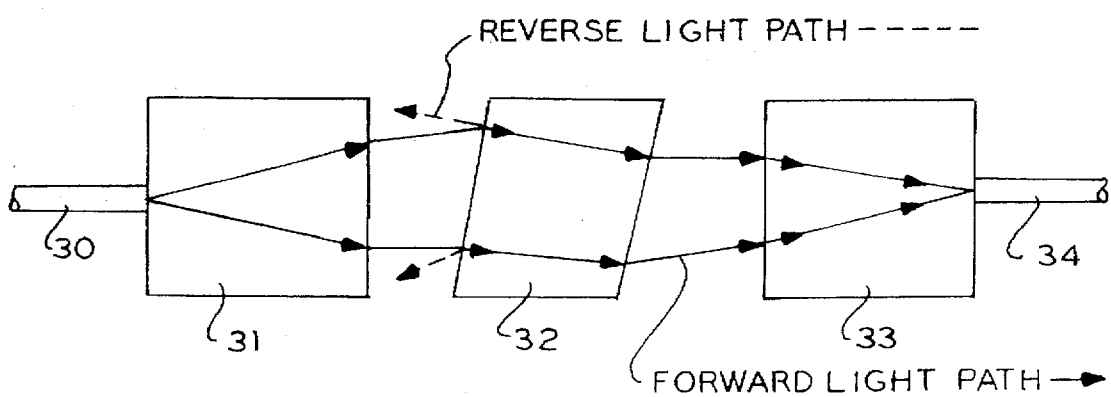
FIG. 8 is a schematic, side elevational cross-sectional view of an in-line fiber optic, wideband optical isolator in accordance with the present invention.

FIG. 8 shows schematically, a fiber optic wavelength independent isolator having an optic fiber, 30, operatively connected to a collimating lens, 31, which collimates the light from the optic fiber. The collimated light is passed through the wavelength independent Faraday rotator-dispersing prism combination of FIG. 7, identified as element 32 in FIG. 8, and from thence to a collimating lens, 33, to an optic fiber 34. Reflected light from optic fiber, 34, cannot pass rearwardly through the combination Faraday rotator-dispersing prisms 32.

We claim:

1. A method for wideband magneto-optical rotation of a polarization state of incident light having a plurality of wavelengths in a given band selected from a plurality of different wavebands comprising:

dispersing said selected light according to wavelength;

providing magneto-optical means for said rotation comprising an optical element responsive to dispersed light incident thereon and passed therethrough along pathways of different lengths progressively and inversely with respect to wavelength within any of the plurality of different wavebands in accordance with the angle of incidence of the dispersed light on a surface of said magneto-optical means element so that shorter wavelengths travel proportionally longer pathways than longer wavelengths sufficiently that the angle of rotation in the magneto-optical means for any of said wavebands is substantially equal for all wavelengths within the selected one waveband; and adjustably setting the relative angle of incidence of the dispersed light from the selected one waveband on said element surface to correspond to the wavelengths of said dispersed light of said selected band.

2. A method for wideband magneto-optical rotation of light in accordance with claim 1 including the step of providing a Faraday rotator as said magneto-optical means.

3. A method for wideband magneto-optical rotation of light in accordance with claim 1 including the step of varying the lengths of the pathways of light passing through the magneto-optical means by adjustably moving the position of the optical axis of the magneto-optical means to be inclined at an angle to the pathways of said incident light.

4. A method for wideband magneto-optical rotation of light in accordance with claim 1 including the step of polarizing the light incident upon the magneto-optical means.

5. A method for wideband magneto-optical rotation of light in accordance with any of claims 1, 2, 3 or 4, and, (a) converging the dispersed light within the waveband emitting from the magneto-optical means to substantially parallel pathways.

6. A method for wideband magneto-optical rotation of light in accordance with claim any of claims 1, 2, 3 or 4, in which:

(a) the light having a plurality of wavelengths within the waveband is dispersed by passing it through a dispersing crystal to separate the light according to wavelength, and (b) converging the dispersed light within the waveband emitting from the magneto-optical means to substantially parallel pathways.

7. A method for wideband magneto-optical rotation of light in accordance with claim 3 including the step of forming the magnetic axis of the magneto-optical means substantially parallel to its optical axis.

8. A method for wideband magneto-optical rotation of light in accordance with claim 3 including the step of moving the magnetic axis of the magneto-optical means so that said magnetic axis is inclined at an angle to its optical axis.

9. A method for optical isolation employing wideband magneto-optical rotation of a polarization state of incident light comprising:

(a) passing light having a plurality of wavelengths within a given waveband through a first light polarizer;

(b) providing a magneto-optical means for said rotation comprising an optical element having a surface for receiving said light passed through said first light polarizer, said magneto-optical means element for passing received light incident thereon along pathways of different lengths progressively and inversely with respect to wavelength within a waveband such that shorter wavelengths travel proportionally longer pathways than longer wavelengths according to the angle of incidence and wavelength of said received light on said surface, said angle of incidence being different for each of a plurality of corresponding different wavebands of light;

(c) adjustably setting the angle of incidence of light from said first light polarizer on said surface to correspond to the given waveband so that the received light from the first light polarizer passes along said pathways of different lengths; and (d) passing light emitting from the magneto-optical means through a second light polarizer having its polarizing axis disposed at an angle to the polarizing axis of the first light polarizer sufficient to minimize rearward transmission of light through the first light polarizer.

10. A method for optical isolation employing wideband magneto-optical rotation of a polarization state of incident light comprising:

(a) passing light having a plurality of wavelengths within a given waveband through first bi-refringent element to generate an ordinary wave and an extraordinary wave, (b) providing a magneto-optical means for said rotation comprising an optical element having a surface for receiving said generated waves incident on said element, said magneto-optical means optical element for passing received light along pathways of different lengths progressively and inversely with respect to wavelength within a waveband such that shorter wavelengths travel proportionally longer pathways than longer wavelengths according to the angle of incidence and wavelength of said received light on said surface, said angle of incidence being different for the waves of each of a plurality of corresponding different wavebands of light;

(c) adjustably setting the angle of incidence of light from said given waveband waves on said surface to correspond to the given waveband waves so that the received light from the given waveband waves passes along said pathways of different lengths; and (d) passing light emitting from the magneto-optical means through a second bi-refringent element.

11. A device for wideband magneto-optical rotation of a polarization state of incident light comprising:

(a) a source of light dispersed according to wavelength within a given waveband;

(b) magneto-optical means for said rotation comprising an optical element in light interrupting relation to the dispersed light and having a surface for receiving the dispersed light incident thereon, said magneto-optical means element providing pathways for received incident light such that shorter wavelength pathways through the magneto-optical means are longer than pathways of longer wavelengths sufficiently that the angle of rotation in the magneto-optical means is substantially equal for all wavelengths within a waveband, said pathways corresponding to light in different wavebands and corresponding different angles of incidence of the received light on the surface; and (c) means for adjustably setting the angle of incidence of dispersed light in said given waveband on said surface to correspond to the given waveband so that the received light from the given waveband passes along said pathways of different lengths.

12. A device in accordance with claim 11 in which the source of dispersed light includes means for polarizing the light.

13. A device in accordance with claim 11 in which the magneto-optical means is a Faraday rotator.

14. A device in accordance with claim 11 and;

(a) light converging means in light interrupting relationship to light emitting from the magneto-optical means.

15. A device for wideband magneto-optical rotation of a polarization state of incident light comprising:

(a) means for dispersing light according to wavelength in a waveband;

(b) magneto-optical means for said rotation comprising an optical element having a surface for receiving incident light, said element being in light intercepting relation to the light emitting from the dispersing means such that the emitting light is incident on said surface; and (c) means for adjustably positioning the magneto-optical means element surface at an angle to the pathways of dispersed light, said angle corresponding to the wavelength of the light on said surface such that the shorter wavelength pathways through the magneto-optical means are longer than pathways for longer wavelengths sufficiently that the angle of rotation in the magneto-optical means is substantially equal for all wavelengths within the given waveband according to the adjusted angle of said surface to the corresponding wavelength.

16. A device in accordance with claim 15 in which the magneto-optical means is a Faraday rotator.

17. A device in accordance with claim 15; and (a) light converging means to converge the dispersed light transmitted through the magneto-optical means.

18. A device in accordance with claim 15; and (a) means for polarizing light before dispersal by the light dispersing means.

19. A device in accordance with claim 15 in which the optical axis and the magnetic axis of the magneto-optical means are substantially parallel.

20. A device in accordance with claim 15 in which the optical axis and the magnetic axis of the magneto-optical means are non-parallel.

21. An optical isolator comprising:

(a) first light polarizing means for polarizing light in a given waveband;

(b) light dispersing means for dispersing light transmitted through the first light polarizing means according to wavelength;

(c) magneto-optical means for rotating a polarization state of incident light comprising an optical element having a surface for receiving said light emitted by said polarizing means, said magneto-optical means including said element for passing the received light incident on said surface along pathways of different lengths progressively and inversely with respect to wavelength within a waveband such that shorter wavelengths travel proportionally longer pathways than longer wavelengths according to the angle of incidence and wavelength of said received light on said surface, said angle of incidence being different for each of a plurality of corresponding different wavebands of light;

(d) means for adjustably setting the angle of incidence of light from said first polarizing means on said element surface to correspond to the given waveband so that the received light from the first polarizing means passes along said pathways of different lengths; and (e) second light polarizing means for polarizing light in a giving waveband disposed to intercept and transmit light transmitted through the magneto-optical means.

22. An optical isolator in accordance with claim 21; and (a) light converging means to converge the dispersed light transmitted through the magneto-optical means.

23. An optical isolator comprising:

(a) a first bi-refringent element for generating an ordinary wave and an extraordinary wave from light in a given light waveband;

(b) light dispersing means for dispersing both the ordinary and extraordinary waves of light emitted from the bi-refringent means in accordance with wavelength;

(c) magneto-optical means for rotating a polarization state of incident light comprising an optical element having a surface for receiving said dispersed waves incident thereon, said magneto-optical means for passing received light along pathways of different lengths progressively and inversely with respect to wavelength such that shorter wavelengths travel proportionally longer pathways than longer wavelengths according to the angle of incidence and wavelength of said received light on said element surface, said angle of incidence being different for the waves of each of a plurality of corresponding different wavebands of light;

(d) means for adjustably setting the angle of incidence of light of said given waveband waves on said element surface to correspond to the given waveband waves and for passing the received light from the given waveband waves along said pathways of different lengths; and (d) a second bi-refringent element for passing light emitting from the magneto-optical means.

24. An optical isolator in accordance with claim 23; and (a) first optical fiber means;

(b) first collimating lens means for receiving light from the optical fiber means;

(c) the first bi-refringent means disposed to receive light passing through the first collimating lens means;

(d) second collimating lens means disposed to receive light passing through the second bi-refringent means; and (e) second optical fiber means for receiving light from the second collimating lens means.

* * * * *

UNITED STATES PATENT AND TRADEMARK OFFICE
CERTIFICATE OF CORRECTION

PATENT NO. : 5,712,728
DATED : January 27, 1998
INVENTOR(S) : Peter Chen

It is certified that error appears in the above-identified patent and that said Letters Patent is hereby corrected as shown below:

Column 1, line 48, before "the" insert --at--.
Column 4, line 25, change "die" to --due--.
Column 8, line 1, after "dispersing" insert --and emitting--.

Signed and Sealed this

Thirty-first Day of March, 1998

Attest:

BRUCE LEHMAN

Attesting Officer     Commissioner of Patents and Trademarks